March 4, 1941.    M. B. MOUNT    2,234,057
CAUSTICIZING TOWER
Filed Jan. 11, 1939    2 Sheets-Sheet 2
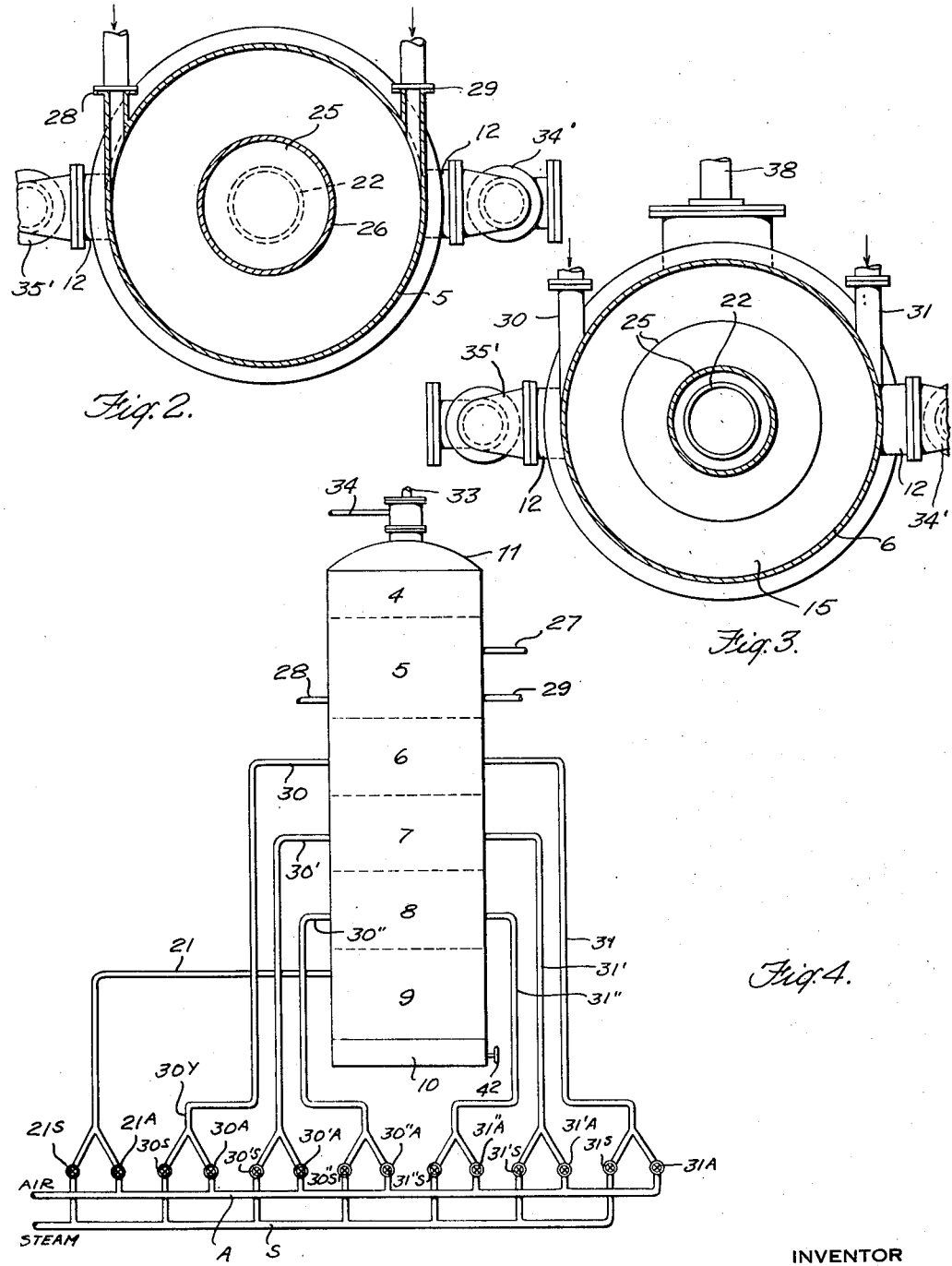
INVENTOR
MORRIS B. MOUNT
BY
ATTORNEY Patented Mar. 4, 1941

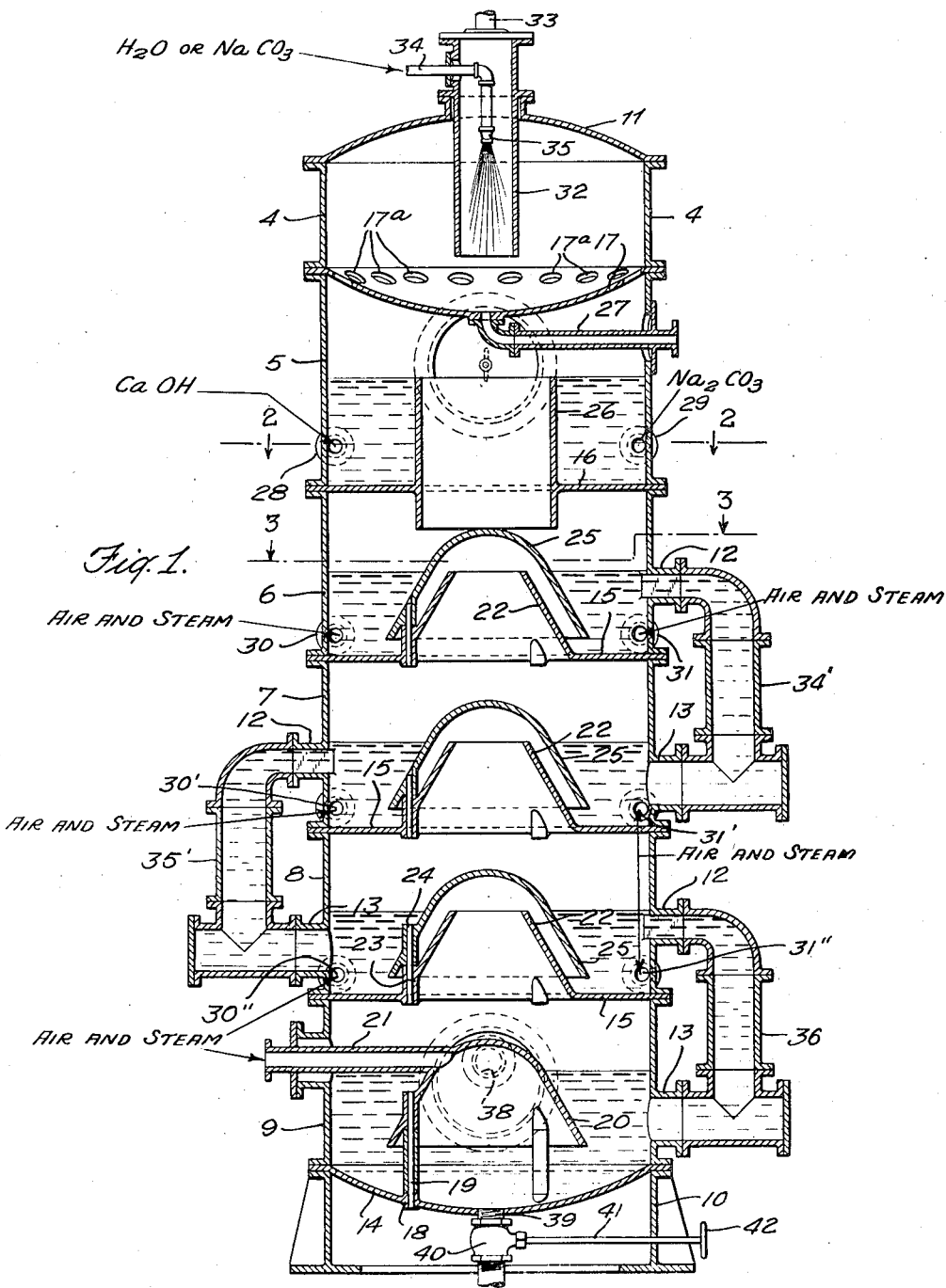

2,234,057

UNITED STATES PATENT OFFICE 2,234,057

CAUSTICIZING TOWER

Morris B. Mount, Lynchburg, Va.

Application January 11, 1939, Serial No. 250,269

3 Claims. (Cl. 23—283)

This invention relates to the art of causticizing and particularly to apparatus for continuously carrying on this operation such, for example, as described in the United States patent to William D. Mount, No. 1,685,929, dated October 2, 1928.

In the process of treating wood pulp, caustic soda is prepared by causticizing sodium carbonate with milk of lime, i. e. calcium hydroxide. The action of these two chemicals when thoroughly mixed together results in the formation of sodium hydroxide (NaOH) which is a liquid and calcium-carbonate ($CaCO_3$) which is a solid. The rapidity and thoroughness with which these two chemicals react is greatly increased by heating and constantly agitating them during reaction. Improvement in the attainment of these results was achieved by the apparatus referred to in the above mentioned patent which was designed for continuous operation. There are times, however, such as over week ends and holidays, that it is desirable to shut down the operation of the apparatus, leaving the various compartments or sections of the apparatus with the liquid standing therein, in a quiescent state. At such times the calcium carbonate settles down out of suspension and becomes impacted in the bottom of the sections to the extent that it occasionally plugs up the outlets. The method for agitating the liquid as disclosed in the previously mentioned patent is not sufficiently positive and powerful to stir up the calcium carbonate effectively, once it has become impacted. Such a method is effective, however, for maintaining the calcium carbonate in its suspended state when once such a state is attained.

It is therefore an object of the present invention to provide an improved apparatus of this type, in which agitating and heating media may be introduced into the various sections, which will loosen any calcium carbonate that may become impacted, and augment the chemical reaction within the various reaction chambers.

Another object of this invention is to introduce the chemicals effective in the causticizing process into the apparatus in a manner to cause rapid and thorough mixing.

Another object is to provide a system of controls for the agitating and heating media whereby the agitation and heating of the chemicals in the several sections may be selectively controlled.

Other objects and advantages of this invention will be apparent from the specification and the accompanying drawings, which show one embodiment of this invention.

Fig. 1 is a sectional elevation of a continuous causticizing unit;

Fig. 2 is a section taken on lines 2—2 of Fig. 1;

Fig. 3 is a section taken on lines 3—3 of Fig. 1; and

Fig. 4 is a diagrammatic illustration of the pipes and controls for regulating the heating and agitating means.

Referring now to Fig. 1, a continuous causticizer embodying the invention may be constructed by providing a series of cylindrical sections 4, 5, 6, 7, 8 and 9 superimposed on each other in coaxial alignment and resting on a base 10, and being covered at the upper end by a cap 11. These cylindrical sections may be provided with flanged outlets 12 and flanged inlets 13 suitable for connections to flanged pipes as indicated.

There is provided a bottom plate 14, clamped between section 9 and the base 10, three similar partition plates 15 clamped between adjacent cylindrical sections successively above the base, a partition plate 16 clamped between sections 5 and 6 and an upper partition plate 17 clamped between the top two sections 4 and 5.

The plate 14 is formed into a basin-like structure and is provided with a boss 18 carrying a stud 19 which supports a downwardly flaring bell 20, the inner chamber of which communicates with a pipe 21 extending to the outside of the cylindrical section 9.

The partition plates 15 have each an upstanding central conical portion 22 open at its upper end. A boss 23 integral with the flange supports a stud 24 by which is mounted a downwardly flaring bell-shaped member 25. The member 25 is located coaxially with the aperture of the cone 22 and spaced a fixed distance therefrom.

The partition 16 is provided with an open ended cylindrical shaped portion 26 which provides a passage from the section 5 to the section 6, the sides of said cylinder extending substantially one-half the height of the section 5 and extending downwardly a short distance into the section 6. The passage through the cylindrical portion 16 is located coaxially with the cylindrical sections.

The partition plate 17 is shaped in the form of a basin with a pipe 27 leading from the lowermost point outwardly through the wall of section 5. A series of small apertures 17a are circumferentially located adjacent the periphery of the plate 16 to permit hot gases and steam arising from below to pass upwardly.

The section 5 is provided with two flanged inlets 28 and 29 (Fig. 2) which are adapted to be connected to flanged pipes which may conduct fluid ingredients to within the section. These inlets are positioned with the axis of their apertures substantially tangential to the cylindrical sections and are so placed that the fluid ingredients discharging from them will flow into the section in directions opposed to each other, thereby causing a turbulent action and a rapid mixing of the two ingredients within the section.

The sections 6, 7 and 8 are each provided with two flanged inlets 30 and 31 (Fig. 3) similar to those of section 5. These inlets are adapted to be connected to pipes through which heating and agitating means, such as steam and compressed air, may be conducted and injected into the sections.

The section 9 is provided with an outlet 38 through which the resultant ingredients accumulated therein may be discharged.

The cap 11 is provided with a pipe casing 32 extending through it and into section 4. The casing is connected to a vent pipe 33 at its outer end for permitting the escape of hot gases and steam arising from below. A pipe 34 projects into the casing and is tipped with a spray nozzle 35 for spraying water or sodium carbonate into the pipe casing.

Steam and air are piped to the various sections of the apparatus as indicated in Fig. 4 from suitable sources of supply. The rate of flow of both steam and air is controlled by a system of valves in a manner to be described later.

In the operation of the above described apparatus sodium carbonate liquor is conveyed into the cylindrical section 5 through the inlet 29, and hydrated lime in the form of milk of lime is conveyed into the same section through the inlet 28. These chemicals are received in the annular trough formed between the walls of the cylindrical section 5 and the cylindrical portion 26, the two walls of which are concentric. The sodium carbonate flows in, in a clockwise direction as viewed in Fig. 2, and the milk of lime flows in, in a counter-clockwise direction, so that the two streams meet in the annular trough while flowing in opposite directions, thus creating a turbulent and thorough mixing action. This action is of importance, as thorough mixing should be accomplished in the shortest possible time, and a vigorous agitation must be effected to hold particles of solid matter or precipitate in constant suspension and prevent them from settling in the trough.

As the chemical fluids continue to pour into the annular trough they overflow over the top edge of the cylindrical portion 26 and flow down the inner walls in a continuous cylindrical sheet into the reaction chamber within the section 6 where this falling sheet of liquid strikes the top of the bell-shaped member 25 and is deflected into the annular trough formed by the wall of the section 6 and the outer wall of the cone-shaped flange 22. While flowing downwardly as above described the liquid comes in contact with hot gases and steam which are rising through the cylindrical portion 26, for reasons to be explained later, and which serve to raise the temperature of the falling liquid to stimulate reaction.

The liquid flowing into section 6 is conducted successively to sections 7, 8 and 9 by means of the pipes 34', 35' and 36, respectively, and is carried off through the outlet 38.

The bell-shaped member 20 is connected by means of a pipe 21 (Figs. 1 and 4) to an air line A carrying air under high pressure and a steam line S carrying steam under relatively low pressure such as exhaust steam. The flow of the steam and air is controlled by valves 21S and 21A so that it is possible to inject either steam or air, or a combination of both in any desired proportion, into the chamber of the bell 20. In the normal operation of the apparatus a combination of both steam and air is conducted into the bell and bubbles out around the lower lip of the bell 20, which is submerged in the liquid. This action both agitates and heats the liquid within the section 9. Much of the steam becomes absorbed in the liquid but the air, becoming heated and laden with moisture, rises upwardly through the aperture of the conical flange 22 to within the chamber of the bell 25 in section 8.

The pressure of air within the section 9 causes the air, trapped under the bell 25 in section 8, to be forced downwardly between the adjacent conical section 22 and the bell where it escapes under the lip of the bell and bubbles upwardly through the liquid in the section to effect heating and agitation.

In a similar manner, the hot, rising moisture-laden air passes through the liquid in sections 7 and 6 and from thence upwardly through the aperture of the cylindrical portion 26, meeting the downwardly flowing fluid therein as previously described. After passing through the cylindrical portion the air passes through the apertures 17a and into the pipe casing 32 where it meets a downwardly projected spray of liquid issuing from the spray nozzle 35. This spray condenses the moisture in the upward flowing stream of gases, carrying the condensate downwardly into the basin 17 where it is conducted away through the pipe 27 for other uses. The air thus cooled and partially dehydrated passes out through the vent pipe 33.

Referring now to Fig. 4 it will be seen that the pipe line 30 is connected by a Y union 30y to both the air supply line A and the steam supply line S, with valves 30A and 30S in the branches of the union for respectively controlling the supply of air or steam to the pipe 30. Each of the pipes 30', 30'', 31, 31' and 31'' is similarly connected to the air and steam supply lines. Each of the control valves has been indicated in Fig. 4 by reference numerals corresponding to the reference numeral of the pipe line it is controlling and in addition has been further designated by the letter A or S to indicate whether it is controlling the air or the steam supply.

As the operation and control for each section is identical it will suffice to describe such operation as relates to one section only, such as section 6 for example.

The reaction between the two chemicals may be rendered more complete and thorough by heating and agitating the mixture, as previously explained. If it is shown, by test of the resultant fluid drawn off from the causticizer, that the reaction has not been as complete as desired from the use of steam and air admitted through the pipe 21 as heating and agitating media, further heating and agitation can be effected, in section 6 for example, by opening the valves 30S, 30A, 31S and 31A, thus admitting air and steam to the section and below the level of the liquid in the section. It will be observed from Fig. 3 that the pipes 30 and 31 enter in such a direction that the jet entering from the pipe 30 tends to whirl the liquid in a counter-clockwise direction, whereas the jet entering from the pipe 31 tends to whirl it in a clockwise direction thereby creating a turbulent action of the liquid in addition to the normal bubbling caused by the air rising in the liquid. Similar action may be effected in the sections 7 and 8 by operation of the valves controlling the air and steam supply for those sections. It will be seen therefore that the control of the heat and agitation in each of the sections may be regulated and varied at will.

In event that the apparatus is shut down for a period of time, the calcium carbonate in the liquor will tend to settle to the bottom of the sections and become impacted. When operation is to be resumed the air valve 30A may be opened which will admit air to the section and start the liquid whirling in a counter-clockwise direction. After a period of time this valve may be closed and the valve 31A may be opened. This will create a turbulent action and finally start the liquid whirling in a clockwise direction. Finally both valves may be opened at the same time. The net result of such operations is a complete scouring action which will loosen and break up the impacted chemical and throw it back into suspension. Similar action may be followed in the same manner in sections 7 and 8.

Although no such pipe connections are shown in section 9, the same could readily be provided and operated in the same manner. The harm caused from the impacted chemicals is less in this section as the outlet is placed higher than in the other sections. A drain pipe 39 however may be placed in the bottom of the lower basin having a valve 40 therein operated by the valve stem 41 which extends outside of the base casting 10 and terminates in a handle 42 fixed to the stem which may be manually manipulated to open the valve and drain off any residue or foreign matter that may collect therein.

While the fundamental novel features of the invention as applied to a single modification have been shown, described and pointed out, it will be understood that various omissions and substitutes and changes in the form and details of the device illustrated, and in its operation, may be made by those skilled in the art without departing from the spirit of the invention. I intend to be limited therefore only as indicated in the scope of the following claims.

I claim:

1. A causticizing tower comprising a cylindrical casing, horizontal partitions dividing the casing into a plurality of superposed chambers and each provided with an opening for the passage of gaseous media, upstanding flanges about the openings, means for admitting reaction chemicals to the uppermost of said chambers, conduits successively connecting the other chambers to permit flow of the reacting chemicals downwardly from one to another, the outlets for the conduits being substantially at the height of said flanges, dome members over the flanges of said other chambers for inducing a reverse flow of rising gaseous media through the reacting chemicals in the respective other chambers, two pipes leading tangentially in opposite directions into each of said other chambers at points near the bottom thereof, and a source of gaseous medium under pressure communicating with each of said pipes.

2. A causticizing tower comprising a cylindrical casing, horizontal partitions dividing the casing into a plurality of superposed chambers and each provided with an opening for the passage of gaseous media, upstanding flanges about the openings, means for effecting a mixing of reaction chemicals in the uppermost of said chambers comprising two conduits leading tangentially into the chamber in opposite directions, conduits successively connecting the other chambers to permit flow of the reacting chemicals downwardly from one to another, the outlets for the conduits being substantially at the height of said flanges, dome members over the flanges of said other chambers for inducing a reverse flow of rising gaseous media through the reacting chemicals in the respective other chambers, two pipes leading tangentially in opposite directions into each of said other chambers at points near the bottom thereof, and a source of gaseous medium under pressure communicating with each of said pipes.

3. A causticizing tower comprising a cylindrical casing, horizontal partitions dividing the casing into a plurality of superposed chambers and each provided with an opening for the passage of gaseous media, upstanding flanges about the openings, means for effecting a mixing of reaction chemicals in the uppermost of said chambers comprising two conduits leading tangentially into the chamber in opposite directions, conduits successively connecting the other chambers to permit flow of the reacting chemicals downwardly from one to another, the outlets for the conduits being substantially at the height of said flanges, dome members over the flanges of said other chambers for inducing a reverse flow of rising gaseous media through the reacting chemicals in the respective other chambers, two pipes leading tangentially in opposite directions into each of said other chambers at points near the bottom thereof, separate sources of heating and agitating media, each pipe having two branches, one communicating with each source, and a control valve in each branch.

MORRIS B. MOUNT.